US009002666B2

(12) United States Patent
Takashima

(10) Patent No.: US 9,002,666 B2
(45) Date of Patent: Apr. 7, 2015

(54) DEFECTIVE-PORTION DETECTOR FOR FUEL INJECTION SYSTEM

(75) Inventor: Yoshimitsu Takashima, Anjo (JP)

(73) Assignee: Denso Corporation, Kariya (JP)

( * ) Notice: Subject to any disclaimer, the term of this patent is extended or adjusted under 35 U.S.C. 154(b) by 529 days.

(21) Appl. No.: 13/372,791

(22) Filed: Feb. 14, 2012

(65) Prior Publication Data

US 2012/0209544 A1 Aug. 16, 2012

(30) Foreign Application Priority Data

Feb. 16, 2011 (JP) .................................. 2011-31018

(51) Int. Cl.

*G01F 17/00* (2006.01)
*F02D 41/24* (2006.01)
*F02D 41/22* (2006.01)
*F02M 57/00* (2006.01)

(52) U.S. Cl.

CPC .......... *F02D 41/2467* (2013.01); *F02D 41/221* (2013.01); *F02D 2200/0602* (2013.01); *F02M 57/005* (2013.01)

(58) Field of Classification Search

CPC ................. G05D 7/0635; G01N 9/002; F02D 2041/224; F02D 2200/0602; F02D 41/221; F02D 41/3845; F02D 41/408; Y02T 10/44; G01F 1/74

See application file for complete search history.

(56) References Cited

U.S. PATENT DOCUMENTS 7,137,294 B2 * 11/2006 Eser et al. .................. 73/114.51
7,861,691 B2 * 1/2011 Nakata et al. ................. 123/456
7,933,712 B2 * 4/2011 Ishizuka et al. ............... 701/114
2008/0228374 A1 9/2008 Ishizuka et al.
2009/0056677 A1 3/2009 Nakata et al.
2009/0088951 A1 4/2009 Ishizuka et al.

FOREIGN PATENT DOCUMENTS

EP 0 860 601 8/1998

OTHER PUBLICATIONS

Office Action (6 pages) dated Feb. 27, 2014, issued in corresponding Chinese Application No. 201210034212.2 and English translation (6 pages).

Office Action (1 page) dated Feb. 5, 2013 issued in corresponding Japanese Application No. 2011-031018 and English translation (1 page).

* cited by examiner

*Primary Examiner* — Elias Desta
(74) *Attorney, Agent, or Firm* — Nixon & Vanderhye PC

(57) ABSTRACT

A defective-portion detector has a detecting portion which detects a variation in fuel pressure as a fuel pressure waveform based on a detection value of a fuel pressure sensor and a computing portion which computes, based on the fuel pressure waveform, a plurality of injection-rate parameters required for identifying an injection-rate waveform corresponding to the fuel pressure waveform. Further, the detector has a determining portion which determines whether each learning value of the injection-rate parameters is an abnormal value and an identifying portion which identifies a defective portion in the fuel injection system based on a combination of abnormal learning values which the determining portion has determined.

12 Claims, 8 Drawing Sheets

| NORMAL INJECTION | td | te | Rα | Rβ | Rmax |
|---|---|---|---|---|---|
| | ○ | ○ | ○ | ○ | ○ |

| INJECTION PORT IS CLOGGED | td | te | Rα | Rβ | Rmax |
|---|---|---|---|---|---|
| | ○ | ○ (NORMAL) | × (ABNORMAL) | × | × |

| ATTRACTING FORCE OF ACTUATOR RUNS SHORT | td | te | Rα | Rβ | Rmax |
|---|---|---|---|---|---|
| | × | ○ | × | ○ | ○ |

| FLOW PASSAGE AREA OF FUEL PASSAGE IS DECREASED | td | te | Rα | Rβ | Rmax |
|---|---|---|---|---|---|
| | ○ | × | ○ | × | ○ |

| CONTINUOUS INJECTION | td | te | Rα | Rβ | Rmax |
|---|---|---|---|---|---|
| | ○ | × (NOT DETECTED) | ○ | × (NOT DETECTED) | ○ |

DEFECTIVE-PORTION DETECTOR FOR FUEL INJECTION SYSTEM

CROSS-REFERENCE TO RELATED APPLICATION

This application is based on Japanese Patent Application No. 2011-31018 filed on Feb. 16, 2011, the disclosure of which is incorporated herein by reference.

TECHNICAL FIELD

The present invention relates to a defective-portion detector for a fuel injection system.

BACKGROUND

JP-2009-85164A (US-2009-0088951A1) shows a fuel injection system which is provided with a fuel pressure sensor detecting a fuel pressure in a fuel passage between a common-rail and an injection port of a fuel injector. Based on a detection value of the fuel pressure sensor, a fuel pressure waveform indicative of a variation in fuel pressure due to a fuel injection is detected. Since the actual injection-rate variation can be computed based on the fuel pressure waveform, an operation of a fuel injection is feedback controlled based on the actual injection-rate variation.

Furthermore, in the above fuel injection system, when a computed injection-rate variation significantly deviates from a specified value, a computer of the system determines that a malfunction, such as clogging of a fuel injector occurs.

In this fuel injection system, although the computer determines whether a malfunction of fuel injection exists, it can not be identified which portion is defective. For example, when a fuel leaks from a common-rail, it is likely that both of the common-rail and the fuel injector may be replaced new ones, notwithstanding that the fuel injector is not faulty.

SUMMARY

It is an object of the present disclosure to provide a defective-portion detector for a fuel injection system, which is capable of identifying a defective portion in a fuel injection system.

A defective-portion detector is applied to a fuel injection system which is provided with a fuel injector injecting a fuel accumulated in an accumulator and a fuel pressure sensor detecting a fuel pressure in a fuel supply passage from the accumulator to an injection port of the fuel injector. The defective-portion detector includes:

a fuel-pressure-waveform detecting portion which detects a variation in the fuel pressure as a fuel pressure waveform based on a detection value of the fuel pressure sensor;

a fuel-injection-rate parameter computing portion which computes, based on the fuel pressure waveform, a plurality of injection-rate parameters required for identifying an injection-rate waveform corresponding to the fuel pressure waveform;

a determining portion which determines whether each learning value of the injection-rate parameters is an abnormal value; and a defective-portion identifying portion which identifies a defective portion in the fuel injection system based on a combination of abnormal learning values which the determining portion has determined.

According to the above configuration, a defective portion in the fuel injection system can be accurately identified based on a combination of abnormal learning values.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, embodiments will be described. A control apparatus is applied to an internal combustion engine (diesel engine) having four cylinders #1-#4.

Figure 1:
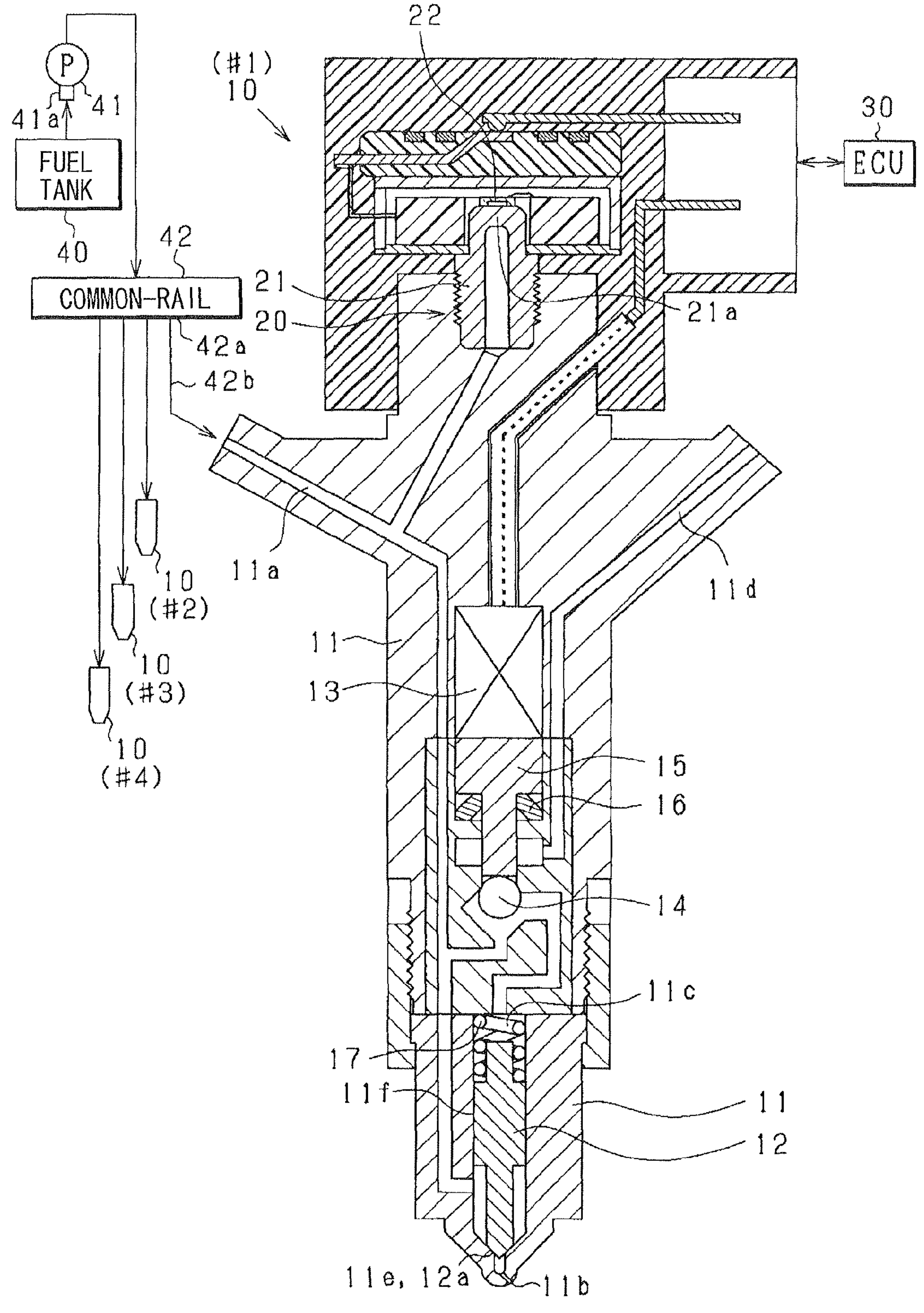
FIG. 1 is a construction diagram showing an outline of a fuel injection system on which a detector is mounted, according to an embodiment.

FIG. 1 is a schematic view showing fuel injectors 10 provided to each cylinder, a fuel pressure sensor 20 provided to each fuel injector 10, an electronic control unit (ECU) 30 and the like.

First, a fuel injection system of the engine including the fuel injector 10 will be explained. A fuel in a fuel tank 40 is pumped up by a high-pressure pump 41 and is accumulated in a common-rail (accumulator) 42 to be supplied to each fuel injector 10 (#1-#4). Each of the fuel injectors 10 (#1-#4) performs a fuel injection sequentially in a predetermined order.

The high-pressure fuel pump 41 is a plunger pump which intermittently discharges high-pressure fuel. A suction control valve (SCV) 41*a* adjusts a fuel quantity supplied from the fuel tank 40 to the fuel pump 41. The ECU 30 controls the SCV 41*a* so that the fuel quantity supplied from the fuel pump 41 to the common-rail 42 is adjusted in such a manner that the pressure in the common-rail 42 agrees with the target fuel pressure.

The fuel injector 10 is comprised of a body 11, a needle valve body 12, an actuator 13 and the like. The body 11 defines a high-pressure passage 11*a* and an injection port 11*b*. The needle valve body 12 is accommodated in the body 11 to open/close the injection port 11*b*.

The body 11 defines a backpressure chamber 11*c* with which the high-pressure passage 11*a* and a low-pressure passage 11*d* communicate. A control valve 14 switches between the high pressure passage 11*a* and the low pressure passage 11*d*, so that the high pressure passage 11*a* communicates with the backpressure chamber 11*c* or the low pressure passage 11*d* communicates with the backpressure chamber 11*c*. When the actuator 13 is energized and the control valve 14 moves downward along with a piston 15 in FIG. 1, the backpressure chamber 11*c* communicates with the low pressure passage 11*d*, so that the fuel pressure in the backpressure chamber 11*c* is decreased. Consequently, the back pressure applied to the valve body 12 is decreased so that the valve body 12 is lifted up (valve-open). A top surface 12*a* of the valve body 12 is unseated from a seat surface 11*e*, whereby the fuel is injected through the injection port 11*b*.

When the actuator 13 is deenergized, the piston 15 is biased upward by a spring 16 so that the control valve 14 moves upward. The backpressure chamber 11*c* communicates with the high pressure passage 11*a*, so that the fuel pressure in the backpressure chamber 11*c* is increased. Consequently, the back pressure applied to the valve body 12 is increased and the spring 17 biases the valve body 12 downward, so that the valve body 12 is lifted down (valve-close). The top surface 12*a* of the valve body 12 is seated on the seat surface 11*e*, whereby the fuel injection is terminated.

The ECU 30 controls the actuator 13 to drive the valve body 12. When the needle valve body 12 opens the injection port 11*b*, high-pressure fuel in the high-pressure passage 11*a* is injected to a combustion chamber (not shown) of the engine through the injection port 11*b*.

A fuel pressure sensor 20 is provided to each of the fuel injectors 10. The fuel pressure sensor 20 includes a stem 21 (load cell) and a pressure sensor element 22. The stem 21 is provided to the body 11. The stem 21 has a diaphragm 21*a* which elastically deforms in response to high fuel pressure in the high-pressure passage 11*a*. The pressure sensor element 22 is disposed on the diaphragm 21*a* to transmit a pressure detection signal depending on an elastic deformation of the diaphragm 21*a* toward the ECU 30.

Figure 2A:
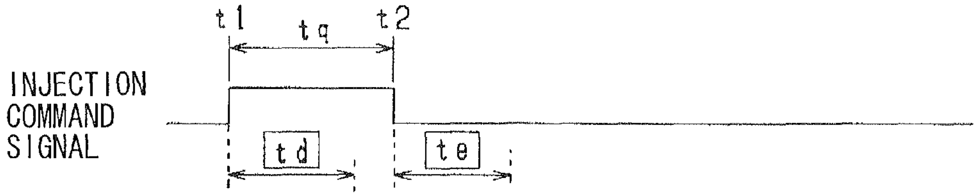
FIGS. 2A, 2B, and 2C are graphs showing variations in a fuel injection rate and a fuel pressure relative to a fuel-injection-command signal.

The ECU 30 has a microcomputer which computes a target fuel injection condition, such as a number of fuel injection, a fuel-injection-start time, a fuel-injection-end time, and a fuel injection quantity. For example, the microcomputer stores an optimum fuel-injection condition with respect to the engine load and the engine speed in a fuel-injection condition map. Then, based on the current engine load and the engine speed, the target fuel-injection condition is computed in view of the fuel-injection condition map. The fuel-injection-command signals t1, t2, Tq (FIG. 2A) corresponding to the computed target injection condition are established based on fuel injection parameters td, te, Rα, Rβ, Rmax, which will be described later in detail. These command signals are transmitted to the fuel injector 10.

Figure 2B:
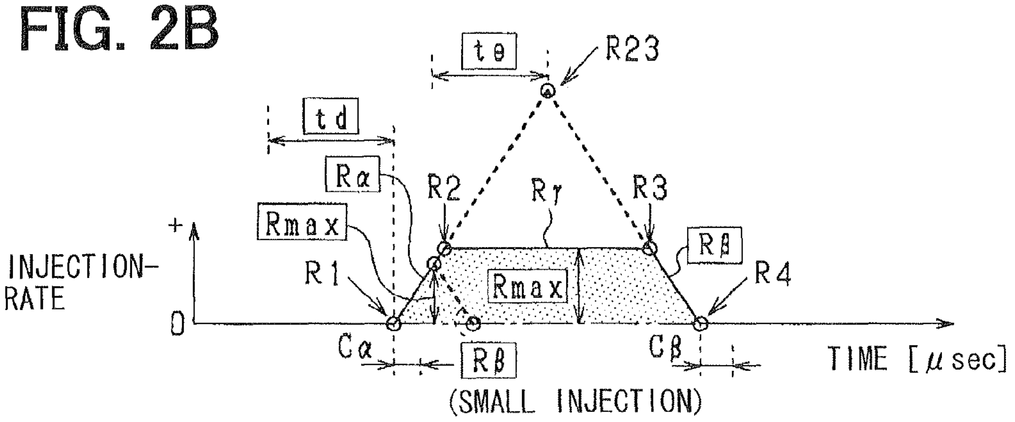
Figure 2C:
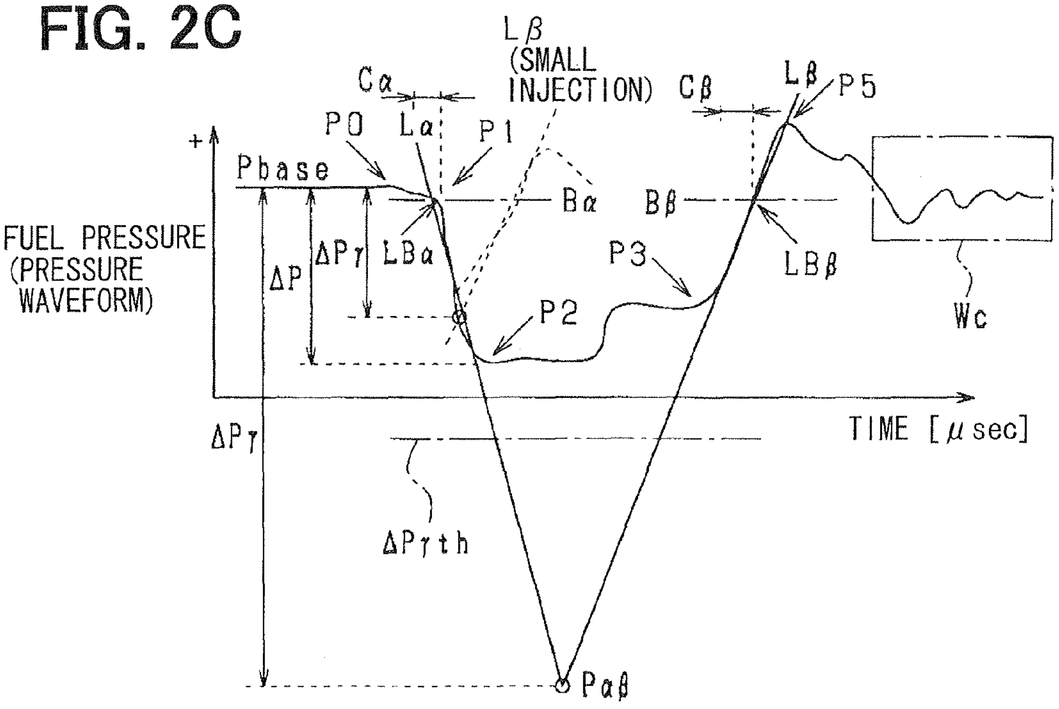

Based on the detection value of the fuel pressure sensor 20, a variation in fuel pressure is illustrated by a fuel pressure waveform (refer to FIG. 2C). Further, based on this fuel pressure waveform, a fuel-injection-rate waveform (FIG. 2B) representing a variation in fuel injection-rate is computed, whereby a fuel injection condition is detected. Then, the injection-rate parameters Rα, Rβ, Rmax which identify the injection-rate waveform are learned, and the injection-rate parameters "te", "td" which identify the correlation between the fuel-injection-command signals (pulse-on timing t1, pulse-off timing t2 and pulse-on period Tq) and the injection condition are learned.

Specifically, a descending pressure waveform from a point P1 to a point P2 is approximated to a descending straight line Lα by least square method. At the point P1, the fuel pressure starts to descend due to a fuel injection. At the point P2, the fuel pressure stops to descend. Then, a time point LBα at which the fuel pressure becomes a reference value Bα on the approximated descending straight line Lα is computed. Since the time point LBα and the fuel-injection-start time R1 have a correlation with each other, the fuel-injection-start time R1 is computed based on the time point LBα. Specifically, a time point prior to the time point LBα by a specified time delay Cα is defined as the fuel-injection-start time R1.

Further, an ascending pressure waveform from a point P3 to a point P5 is approximated to an ascending straight line Lβ by least square method. At the point P3, the fuel pressure starts to ascend due to a termination of a fuel injection. At the point P5, the fuel pressure stops to ascend. Then, a time point LBβ at which the fuel pressure becomes a reference value Bβ on the approximated ascending straight line Lβ is computed. Since the time point LBβ and the fuel-injection-end time R4 have a correlation with each other, the fuel-injection-end time R4 is computed based on the time point LBβ. Specifically, a time point prior to the time point LBβ by a specified time delay Cβ is defined as the fuel-injection-end time R4.

In view of the fact that an inclination of the descending straight line Lα and an inclination of the injection-rate increase have a high correlation with each other, an inclination of a straight line Rα, which represents an increase in fuel injection-rate in FIG. 2(*b*), is computed based on an inclination of the descending straight line Lα. Specifically, an inclination of the line Lα is multiplied by a specified coefficient to obtain the inclination of the straight line Rα. Similarly, in view of that an inclination of the ascending straight line Lβ and an inclination of the injection-rate decrease have a high correlation with each other, an inclination of a straight line Rβ, which represents a decrease in fuel injection-rate, is computed based on an inclination of the ascending straight line Lβ.

Then, based on the straight lines Rα, Rβ, a valve-close start time R23 is computed. At this time R23, the valve body 12 starts to be lifted down along with a fuel-injection-end command signal. Specifically, an intersection of the straight lines Rα and Rβ is defined as the valve-close start time R23. Further, a fuel-injection-start time delay "td" of the fuel-injection-start time R1 relative to the pulse-on time t1 is computed. Also, a fuel-injection-end time delay "te" of the valve-close start time R23 relative to the pulse-off time t2 is computed.

An intersection of the descending straight line Lα and the ascending straight line Lβ is obtained and a pressure corresponding to this intersection is computed as an intersection pressure Pαβ. Further, a differential pressure ΔPγ between a reference pressure Pbase and the intersection pressure Pαβ is computed. In view of the fact that the differential pressure ΔPγ and the maximum injection-rate Rmax have a high correlation with each other, the maximum injection-rate Rmax is computed based on the differential pressure ΔPγ. Specifically, the differential pressure ΔPγ is multiplied by a correlation coefficient Cγ to compute the maximum injection-rate Rmax. In a case that the differential pressure ΔPγ is less than a specified value ΔPγth (small injection), the maximum fuel injection-rate Rmax is defined as follows:

$$R\text{max}=\Delta P\gamma\times C\gamma$$

In a case that the differential pressure ΔPγ is not less than the specified value ΔPγth (large injection), a predetermined value Rγ is defined as the maximum injection-rate Rmax.

The small injection corresponds to a case in which the valve 12 starts to be lifted down before the injection-rate reaches the predetermined value Rγ. The fuel injection quantity is restricted by the seat surfaces 11*e* and 12*a*. Meanwhile, the large-injection corresponds to a case in which the valve 12 starts to be lifted down after the injection-rate reaches the predetermined value Rγ. The fuel injection quantity depends on the flow area of the injection port 11*b*. Incidentally, when the injection command period Tq is long enough and the injection port 11*b* has been opened even after the maximum injection-rate is achieved, the shape of the injection-rate waveform becomes trapezoid, as shown in FIG. 2B. Meanwhile, in a case of the small-injection, the shape of the injection-rate waveform becomes triangle.

The above predetermined value Rγ, which corresponds to the maximum injection-rate Rmax in case of the large-injection, varies along with an aging deterioration of the fuel injector 10. For example, if particulate matters are accumulated in the injection port 11*b* and the fuel injection quantity decreases along with age, the pressure drop amount ΔP shown in FIG. 2C becomes smaller. Also, if the seat surfaces 11*e*, 12*a* are worn away and the fuel injection quantity is increased, the pressure drop amount ΔP becomes larger. It should be noted that the pressure drop amount ΔP corresponds to a detected pressure drop amount which is caused due to a fuel injection. For example, it corresponds to a pressure drop amount from the reference pressure Pbase to the point P2, or from the point P1 to the point P2.

In the present embodiment, in view of the fact that the maximum injection-rate Rmax (predetermined value Rγ) in a large-injection has high correlation with the pressure drop amount ΔP, the predetermined value Rγ is established based on the pressure drop amount ΔP. That is, the learning value of the maximum injection-rate Rmax in the large-injection corresponds to a learning value of the predetermined value Rγ based on the pressure drop amount ΔP.

As above, the injection-rate parameters td, te, Rα, Rβ, Rmax can be computed from the fuel pressure waveform. Then, based on the learning values of these parameters td, te, Rα, Rβ, Rmax, the injection-rate waveform (refer to FIG. 2B) corresponding to the fuel-injection-command signal (FIG. 2A) can be computed. An area of the computed injection-rate waveform (shaded area in FIG. 2B) corresponds to a fuel injection quantity. Thus, the fuel injection quantity can be computed based on the injection-rate parameters.

Figure 3:
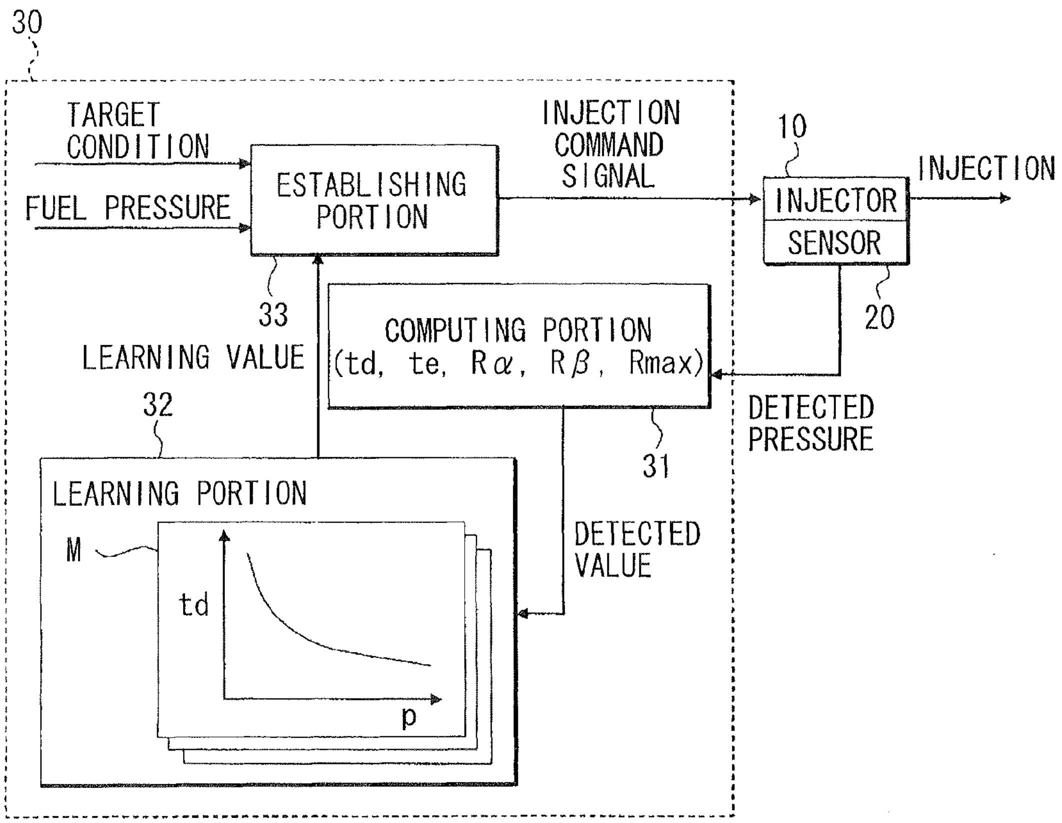
FIG. 3 is a block diagram showing a learning process of an injection-rate parameters and a setting process of a fuel-injection-command signal according to the embodiment.

FIG. 3 is a block diagram showing a learning process of a fuel injection-rate parameter and a setting process of a fuel-injection-command signal. An injection-rate-parameter computing portion 31 computes the injection-rate parameters td, te, Rα, Rβ, Rmax based on the fuel pressure waveform detected by the fuel pressure sensor 20.

A learning portion 32 learns the computed injection-rate parameters and stores the updated parameters in a memory of the ECU 30. Since the injection-rate parameters vary according to the supplied fuel pressure (fuel pressure in the common-rail 42), it is preferable that the injection-rate parameters are learned in association with the supplied fuel pressure or a reference pressure Pbase (refer to FIG. 2C). The fuel injection-rate parameters relative to the fuel pressure are stored in an injection-rate parameter map M shown in FIG. 3.

An establishing portion (control portion) 33 obtains the injection-rate parameter (learning value) corresponding to the current fuel pressure from the injection-rate parameter map M. Then, based on the computed injection-rate parameters, the fuel-injection-command signals "t1", "t2", "Tq" corresponding to the target injection condition are established. When the fuel injector 10 is operated according to the above fuel-injection-command signals, the fuel pressure sensor 20 detects the fuel pressure waveform. Based on this fuel pressure waveform, the injection-rate-parameter computing portion 31 computes the injection-rate parameters td, te, Rα, Rβ, Rmax.

That is, the actual fuel injection condition (injection-rate parameters td, te, Rα, Rβ, Rmax) relative to the fuel-injection-command signals is detected and learned. Based on this learning value, the fuel-injection-command signals corresponding to the target injection condition are established. Therefore, the fuel-injection-command signal is feedback controlled based on the actual injection condition, whereby the actual fuel injection condition is accurately controlled in such a manner as to agree with the target injection condition even if the deterioration with age is advanced.

Especially, the injection command period Tq is feedback controlled based on the injection-rate parameter so that the actual fuel injection quantity agrees with the target fuel injection quantity.

Figure 4:
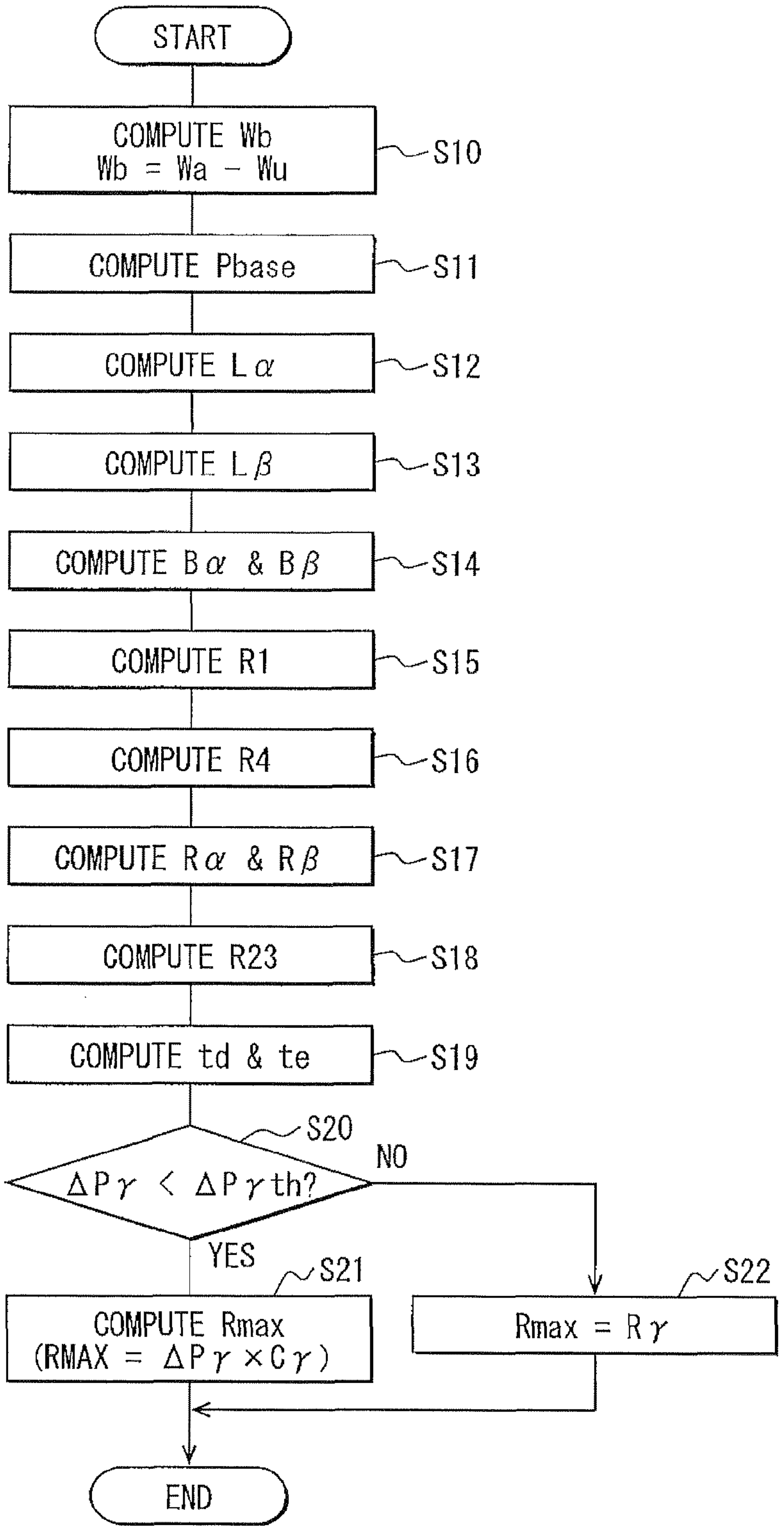
FIG. 4 is a flowchart showing a processing for computing injection-rate parameters according to the embodiment.

Referring to FIG. 4, a processing for deriving the injection-rate parameters td, te, Rα, Rβ, Rmax from the fuel pressure waveform will be described hereinafter. This processing shown in FIG. 4 is executed by a microcomputer of the ECU 30 every when one fuel injection is performed.

In step S10 (fuel-pressure-waveform detecting portion), the computer computes a fuel injection waveform Wb (corrected pressure waveform) which is used for computing the injection-rate parameters. In the following description, a cylinder in which a fuel injection is currently performed is referred to as an injection cylinder and a cylinder in which no fuel injection is currently performed is referred to as a non-injection cylinder. Further, a fuel pressure sensor 20 provided in the injection cylinder 10 is referred to as an injection-cylinder pressure sensor and a fuel pressure sensor 20 provided in the non-injection cylinder 10 is referred to as a non-injection-cylinder pressure sensor.

Figure 5A:
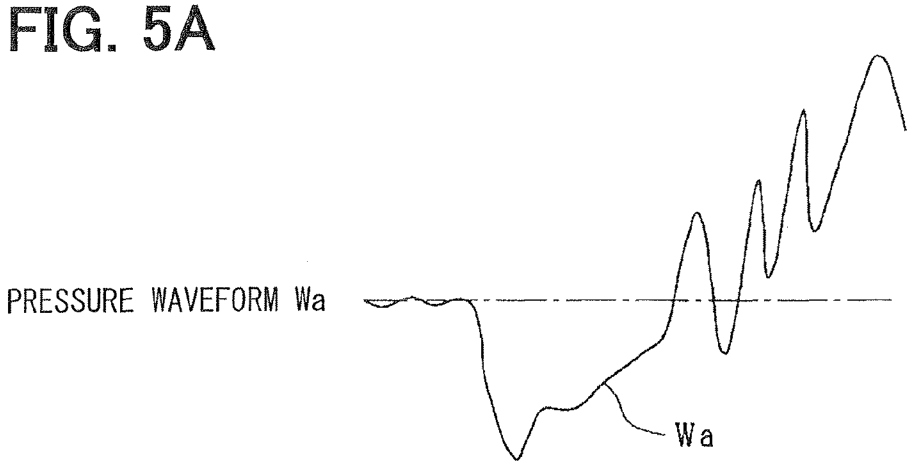
FIGS. 5A, 5B and 5C are charts which respectively show an injection-cylinder pressure waveform Wa, a non-injection-cylinder pressure waveform Wu, and an injection pressure waveform Wb.
Figure 5B:
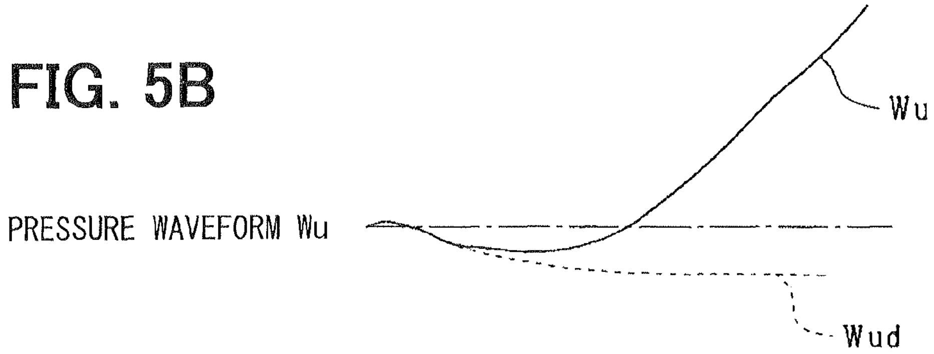
Figure 5C:
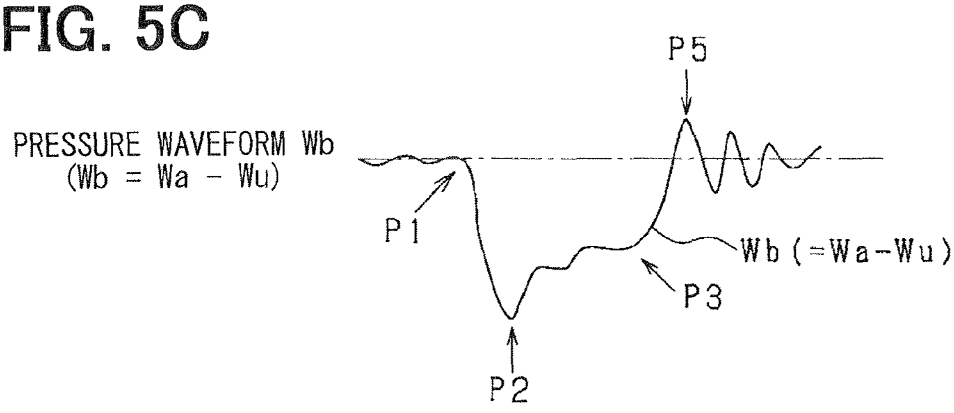

The fuel pressure waveform Wa (refer to FIG. 5A) detected by the injection-cylinder pressure sensor 20 includes not only the waveform due to a fuel injection but also the waveform due to other matters described below. In a case that the fuel pump 41 intermittently supplies the fuel to the common-rail 42, the entire fuel pressure waveform Wa ascends when the fuel pump supplies the fuel while the fuel injector 10 injects the fuel. That is, the fuel pressure waveform Wa includes a fuel pressure waveform Wb (refer to FIG. 5C) representing a fuel pressure variation due to a fuel injection and a pressure waveform Wu (refer to FIG. 5B) representing a fuel pressure increase by the fuel pump 41.

Even in a case that the fuel pump 41 supplies no fuel while the fuel injector 10 injects the fuel, the fuel pressure in the fuel injection system decreases immediately after the fuel injector 10 injects the fuel. Thus, the entire fuel pressure waveform Wa descends. That is, the fuel pressure waveform Wa includes a waveform Wb representing a fuel pressure variation due to a fuel injection and a waveform Wud representing a fuel pressure decrease in the fuel injection system.

In view of a fact that the non-injection pressure waveform Wu (Wud) detected by the non-injection-cylinder pressure sensor 20 represents a fuel pressure variation in the common-rail 42, the non-injection pressure waveform Wu (Wud) is subtracted from the injection pressure waveform Wa detected by the injection-cylinder pressure sensor 20 to obtain the injection waveform Wb. The injection waveform Wb is shown in FIG. 2C.

Moreover, in a case that a multiple injection is performed, a pressure pulsation Wc due to a prior injection, which is shown in FIG. 2C, overlaps with the fuel pressure waveform Wa. Especially, in a case that an interval between injections is short, the fuel pressure waveform Wa is significantly influenced by the pressure pulsation Wc. Thus, it is preferable that the pressure pulsation Wc and the non-injection pressure waveform Wu (Wud) are subtracted from the fuel pressure waveform Wa to compute the injection waveform Wb.

In step S11 (reference-pressure computing portion), an average fuel pressure of the reference pressure waveform is computed as a reference pressure Pbase. The reference pressure waveform corresponds to a part of the injection waveform Wb of a period in which the fuel pressure has not started to be decreased due to a fuel injection. For example, a part of the injection component Wb corresponding a time period "TA" from the injection-start command time t1 until a specified time elapses can be defined as the reference pressure waveform. Alternatively, an inflection point P1 is computed based on differentiation values of the descending pressure waveform, and a part of the injection component Wb corresponding to a time period from the injection-start command time t1 to the inflection point P1 is defined as the reference pressure waveform.

In step S12 (approximating portion), a descending portion of the injection waveform Wb is approximated to a descending straight line Lα. For example, a part of the injection waveform Wb corresponding to a specified time period TB from the injection-start command time t1 until a specified time elapses may be defined as the descending pressure waveform. Alternatively, inflection points P1 and P2 are computed based on differential values of the descending pressure waveform, and a part of the injection waveform Wb corresponding to between the inflection ports P1 and P2 may be defined as the descending pressure waveform. Then, based on the fuel pressure values of the descending pressure waveform, the straight line Lα is approximated by the least squares method. Alternatively, a tangent line at a point of the descending waveform at which the differentiation value is minimum may be defined as the approximated straight line Lα.

In step S13 (approximating portion), an ascending portion of the injection waveform Wb is approximated to an ascending straight line Lβ. For example, a part of the injection waveform Wb corresponding to a specified time period TC from the injection-end command time t2 until a specified time elapses may be defined as the ascending pressure waveform. Alternatively, inflection points P3 and P5 are computed based on differential values of the ascending pressure waveform, and a part of the injection waveform Wb corresponding to between the inflection points P3 and P5 may be defined as the ascending pressure waveform. Then, based on the fuel pressure values of the ascending pressure waveform, the straight line Lβ is approximated by the least squares method. Alternatively, a tangent line at a point of the ascending waveform at which the differentiation value is maximum may be defined as the approximated straight line Lβ.

In step S14, based on the reference pressure Pbase, reference values Bα and Bβ are computed. For example, pressure values which are lower than the reference pressure Pbase by a specified quantity may be defined as the reference values Bα and Bβ. It should be noted the reference values Bα and Bβ are not always equal to each other. Further, the above specified quantity of the pressure value may be varied according to the reference pressure Pbase and the fuel temperature.

Then, in step S15, a time point LBα at which the fuel pressure becomes a reference value Bα on the approximated straight line Lα is computed. Since the time point LBα and the fuel-injection-start time R1 have a correlation with each other, the fuel-injection-start time R1 is computed based on the time point LBα. Specifically, a time point prior to the time point LBα by a specified time delay Cα is defined as the fuel-injection-start time R1.

Then, in step S16, a time point LBβ at which the fuel pressure becomes a reference value Bβ on the approximated straight line Lβ is computed. Since the time point LBβ and the fuel-injection-end time R4 have a correlation with each other, the fuel-injection-end time R4 is computed based on the time point LBβ. Specifically, a time point prior to the time point LBβ by a specified time delay Cβ is defined as the fuel-injection-end time R4. The above time delays Cα, Cβ may be varied according to the reference pressure Pbase and the fuel temperature.

Then, in step S17, in view of fact that an inclination of the line Lα and an inclination of the injection-rate increase have a high correlation with each other, an inclination of a straight line Rα, which represents an increase in fuel injection-rate in FIG. 2B, is computed based on an inclination of the straight line Lα. Specifically, an inclination of the line Lα is multiplied by a specified coefficient to obtain the inclination of the straight line Rα. In addition, based on the fuel-injection-start time R1 computed in step S15 and the inclination of the straight line Rα computed in step S17, the straight line Rα can be identified.

Furthermore, in step S17, in view of fact that an inclination of the line Lβ and an inclination of the injection-rate decrease have a high correlation with each other, an inclination of a straight line Rβ, which represents a decrease in fuel injection-rate, is computed based on an inclination of the straight line Lβ. Specifically, an inclination of the line Lβ is multiplied by a specified coefficient to obtain the inclination of the straight line RP. In addition, based on the fuel-injection-end time R4 computed in step S16 and the inclination of the straight line Rβ computed in step S17, the straight line Rβ can be identified. The above specified coefficient of the pressure value may be varied according to the reference pressure Pbase and the fuel temperature.

In step S18, based on the straight lines Rα, Rβ computed in step S17, a valve-close start time R23 is computed. At this time R23, the valve body 12 starts to be lifted down along with a fuel-injection-end command signal. Specifically, an intersection of the straight lines Rα and Rβ is defined as the valve-close start time R23.

In step S19, a fuel-injection-start time delay "td" of the fuel-injection-start time R1 relative to the pulse-on time t1 is computed. Also, a fuel-injection-end time delay "te" of the valve-close start time R23 relative to the pulse-off time t2 is computed. The fuel-injection-end time delay "te" is a time delay from the injection-end command time t2 until the control valve 14 starts to be operated. These time delays "td", "te" are parameters which represent response delays of the injection-rate variation relative to the fuel-injection-command signals. Also, time delays from the time t1 to the time R2, from the time t2 to the time R3 and from the time t2 to the time R4 are parameters representing the response delays.

In step S20, it is determined whether a differential pressure ΔPγ between the reference pressure Pbase and an intersection pressure Pap is less than a specified value ΔPγth. When the answer is YES in step S20, the procedure proceeds to step S21 in which a maximum injection-rate Rmax is computed based on the differential pressure ΔPγ (Rmax=ΔPγ×Cγ). When the answer is NO in step S20, the procedure proceeds to step S22 (maximum-injection-rate computing portion) in which the predetermined value Rγ is defined as the maximum injection-rate Rmax.

Figure 6A:
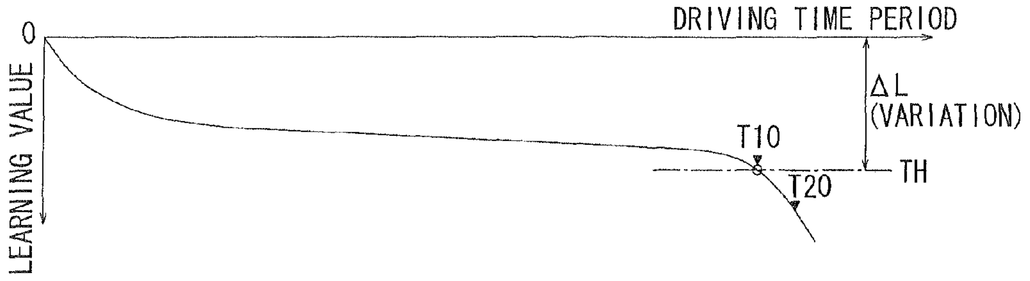
FIGS. 6A, 6B, 6C and 6D are charts for explaining a processing in which a shortage of fuel injection quantity is compensated.
Figure 6B:
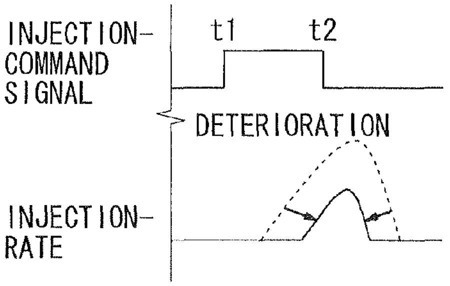
Figure 6C:
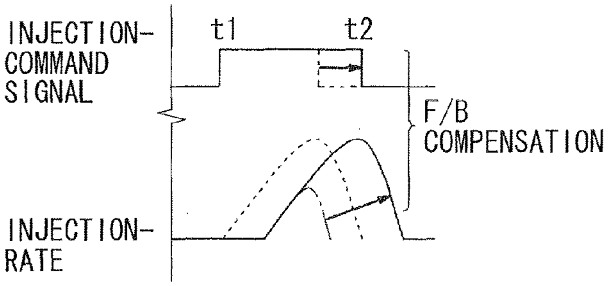

If component parts of the fuel injection system are deteriorated with age, the shape of the injection-rate waveform may be varied even though the fuel-injection-command signal is not varied. For example, the injection-rate waveform may become smaller as shown by a solid line in FIG. 6B. In this case, as shown in FIG. 6C, the injection-end command time t2 is delayed so that the fuel injection quantity is ensured.

Figure 6D:
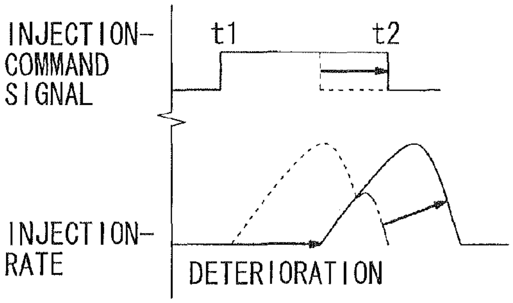

However, if the correction quantity exceeds a threshold as shown in FIG. 6D, although the fuel injection quantity becomes a target value, a combustion condition deviates from a desired condition. It is likely that its emission and drivability deteriorate and the engine output may be also deteriorated.

According to the present embodiment, it is estimated that deterioration in engine output will occur, as follows. That is, when the injection-rate waveform is deformed as shown in FIGS. 6B, 6C and 6D, a variation in learning values of the injection-rate parameters td, te, Rα, Rβ, Rmax relative to initial values exceeds a threshold TH as shown in FIG. 6A. Such an abnormality in learning values occurs prior to the deterioration in engine output. That is, after the abnormality in learning values occurs at time point T10, the engine output starts to deteriorate. Thus, if the abnormality in learning values is detected beforehand, an occurrence of the deterioration in engine output can be estimated before the engine output actually deteriorates at time point T20.

Figure 7:
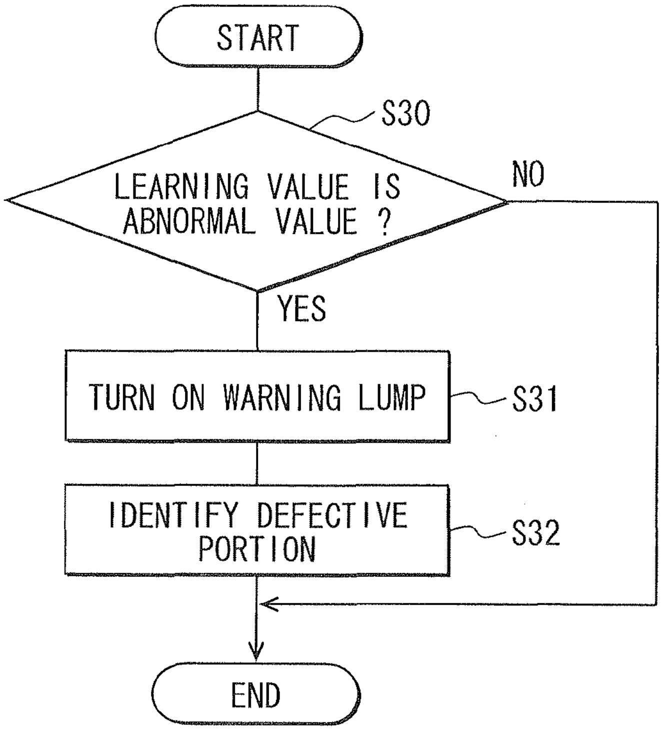
FIG. 7 is a flowchart showing a processing for determining whether a learning value is abnormal and for identifying a defective portion in a fuel injection system, according to the embodiment.

Furthermore, according to the present embodiment, in addition to an estimation of occurrence of the deterioration in engine output, it is able to identify a defective portion in a fuel injection system, according to a procedure shown in FIGS. 7 and 8.

FIG. 7 is a flowchart showing the above procedure which a microcomputer of the ECU 30 executes when the learning portion 32 updates the learning value.

In step S30 (determining portion), the computer determines whether each learning value of the injection-rate parameters td, te, Rα, Rβ, Rmax is an abnormal value. Specifically, a variation ΔL in learning value relative to an initial value (refer to FIG. 6A) is computed. The initial value is a learning value of when the fuel injector 10 is shipped. When the variation ΔL exceeds the threshold TH, the computer determines that the learning value is an abnormal value. Alternatively, when computing the variation ΔL by subtracting the initial value from the current learning value, an average value of the learning values in a specified period can be used as a current learning value, whereby it is restricted that a learning error affects the abnormality determination.

In step S31, a warning lump is turned on so that a vehicle driver is notified that a malfunction occurs in the fuel injection system. This notification is conducted at the time point T10 prior to the time point T20 at which the deterioration in engine output occurs. Therefore, the notification in step S31 corresponds to a preannouncement that the deterioration in engine output will occur.

In step S32 (defective-portion identifying portion), the computer identifies a defective portion in the fuel injection system based on a combination of abnormal learning values and a combination of normal learning values of the injection-rate parameters td, te, Rα, Rβ, Rmax, which are determined in step S30.

Referring to FIGS. 8A to 8E, a processing for identifying a defective portion in the fuel injection system will be described hereinafter.

Figure 8A:
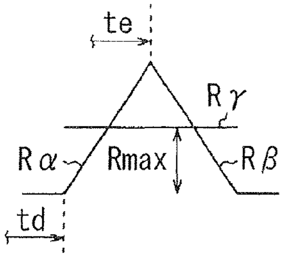
FIGS. 8A, 8B, 8C, 8D and 8E are charts for explaining processings for identifying a defective portion.

FIG. 8A shows an injection-rate waveform of the large injection shown in FIG. 2B. This injection-rate waveform represents a normal case where no abnormal learning value exists. Meanwhile, solid lines in FIGS. 8B to 8E show injection-rate waveforms in cases where various malfunctions occur in the fuel injection system. An inclination of the straight line Rα corresponds to an increasing speed of the injection-rate and is learned as the injection-rate parameter Rα. An inclination of the straight line Rβ corresponds to a decreasing speed of the injection-rate and is learned as the injection-rate parameter Rβ.

In FIGS. 8A to 8E, the determination results in step S30 are shown in each table. A normal injection-rate parameter is denoted by "○" and an abnormal injection-rate parameter is denoted by "×". In FIG. 8A, all of the injection-rate parameters is denoted by "○". In FIGS. 8B to 8E, some of the injection-rate parameters are denoted by "×".

Referring to FIGS. 8B to 8E, an abnormality of each case will be described in detail.

Figure 8B:
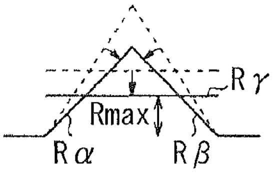

FIG. 8B shows a case in which the injection port 11*b* of the fuel injector 10 is clogged. If the injection port 11*b* is clogged, the normal injection-rate waveform illustrated by dashed lines is deformed into an abnormal injection-rate waveform illustrated by solid lines. That is, the increasing speed and the decreasing speed of the injection-rate becomes lower than specified values and the maximum injection-rate Rmax becomes smaller than a specified value, whereby the computer determines that three learning values Rα, Rβ, Rmax are abnormal values. However, even if the injection port 11*b* is clogged, the computer determines that the other learning values "td", "te" are normal values. Therefore, in a case that the computer determines that the learning values Rα, Rβ, Rmax are abnormal values and the learning values "td", "te" are normal values, the computer determines, in step S32, that the injection port 11*b* is clogged and identifies the injection port 11*b* of the fuel injector 10 as a defective portion.

Figure 8C:
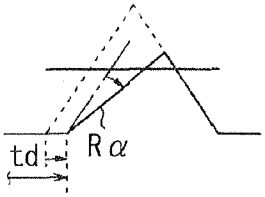

FIG. 8C shows a case in which a driving force of the actuator 13, for example, an attracting force of a solenoid is deteriorated, so that the control valve 14 can not be operated promptly. If the attracting force of the actuator 13 runs shortage, the normal injection-rate waveform illustrated by dashed lines is deformed into an abnormal injection-rate waveform illustrated by solid lines. That is, the increasing speed of the injection-rate becomes lower than a specified value and the fuel-injection-start time delay "td" is prolonged longer than a specified time period, whereby the computer determines that two learning values "td", Rα are abnormal values. However, even if the attracting force of the actuator 13 runs shortage, the computer determines that the other learning values "te", Rβ, Rmax are normal values. Therefore, in a case that the computer determines that the learning values "td", Rα are abnormal values and the learning values "te", Rβ, Rmax are normal values, the computer determines, in step S32, that the driving force of the actuator 13 is deteriorated and identifies the actuator 13 of the fuel injector 10 as a defective portion.

Figure 8D:
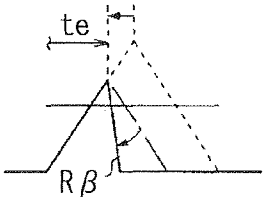

FIG. 8D shows a case in which a fuel passage is clogged with foreign matters and its flow passage area is decreased. This fuel passage corresponds to a high-pressure passage between an outlet of the fuel pump 41 and the injection port 11*b* of the fuel injector 10. Specifically, the flow passage area is decreased in the high-pressure passage 11*a* of the fuel injector 10, the high-pressure pipe 42*b* connecting the common-rail 42 and the fuel injector 10, and/or a high-pressure pipe connecting the outlet of the fuel pump 41 and the common-rail 42. If the injection-rate waveform is abnormal only with respect to a specified cylinder, the high-pressure passage 11*a* or the high-pressure pipe 42*b* is identified as a defective portion in the injection system.

If the flow passage area is abnormally decreased, the normal injection-rate waveform illustrated by dashed lines is deformed into an abnormal injection-rate waveform illustrated by solid lines in FIG. 8D. That is, the decreasing speed of the injection-rate becomes higher than a specified value and the fuel-injection-start time delay "td" is shortened than a specified period, whereby the computer determines that two learning values "te", Rα are abnormal values. However, even if the flow passage area is abnormally decreased, the computer determines that the other learning values "td", Rα, Rmax are normal values. Therefore, in a case that the computer determines that the learning values "te", Rβ are abnormal values and the learning values "td", Rα, Rmax are normal values, the computer determines, in step S32, that the fuel passage, such as the high-pressure passage 11*a* and the high-pressure pipe 42*b*, is clogged with foreign matters and its flow passage area is abnormally decreased. The computer identifies the fuel passage as a defective portion.

Figure 8E:
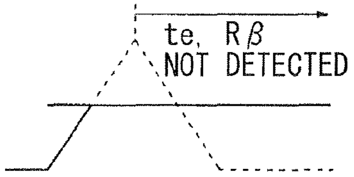

FIG. 8E shows a case in which a valve-closing mechanism of the fuel injector 10 becomes faulty so that the fuel is continuously injected through the fuel injector 10. Specifically, in this case, the piston 15 can not slide well, the springs 16, 17 do not work, or the valve 12 can not slide well. If the valve-closing mechanism of the fuel injector 10 becomes faulty as above, the fuel injector 10 can not close the injection port 11*b* even though an injection-end-command signal is transmitted to the fuel injector 10.

If an abnormal continuous fuel injection occurs, the normal injection-rate waveform illustrated by dashed lines is deformed into an abnormal injection-rate waveform illustrated by solid lines in FIG. 8E. That is, even though the injection-end-command signal is generated, the injection-rate does not start to decrease. Since the injection-rate does not become zero, the fuel-injection-end time delay and the decreasing speed of the injection-rate can not be computed. Thus, the computer determines that the two learning values "te", Rβ are abnormal values. However, even if the valve-closing mechanism of the fuel injector 10 becomes faulty, the computer determines that the other learning values "td", Rα, Rmax are normal values. Meanwhile, with respect to the injection-rate waveforms of the successive fuel injections, the computer determines that all of the learning values td, te, Rα, Rβ, Rmax is abnormal values. Therefore, in a case that the computer determines that the learning values "te", Rβ are abnormal values and the learning values "td", Rα, Rmax are normal values, the computer determines, in step S32, that the fuel is abnormally continuously injected through the fuel injector 10 and identifies the valve-closing mechanism of the fuel injector 10 as a defective portion. The valve-closing mechanism of the fuel injector 10 includes the piston 15, the springs 16, 17 and the valve 12.

The information about the defective portion identified in step S32 is stored in a memory, whereby a maintenance operator can be informed of the defective portion.

As described above, according to the present embodiment, a defective portion in the fuel injection system can be accurately identified based on a combination of abnormal learning values.

Moreover, it can be informed beforehand that the engine output is likely deteriorated. Thus, the deterioration in the engine output can be avoided beforehand.

Furthermore, a defective portion is identified in step S32 only when the answer is YES in step S30, so that a frequency of identifying a defective portion can be reduced and a computation load of the computer can be also reduced.

[Other Embodiment]

The present invention is not limited to the embodiments described above, but may be performed, for example, in the following manner. Further, the characteristic configuration of each embodiment can be combined.

In the above embodiment, a time delay from the injection-start command time t1 to the fuel-injection-start time R1 is learned as the fuel-injection-start time delay "td" of the injection-rate parameters. However, as a modification, based on a time period from the injection-start command time "t1" to the point "P0", a computer computes a valve-open time delay of the fuel injector 10. This time delay may be learned as the fuel-injection-start time delay of the injection-rate parameter. The valve-open time delay corresponds to an operation delay of the control valve 14.

In the above embodiment, a time delay from the injection-end command time t2 to the valve-close start time R23 is learned as the fuel-injection-end time delay "te" of the injection-rate parameters. However, as a modification, a time delay from the injection-end command time t2 to the fuel-injection-end time R4 may be learned as the fuel-injection-end time delay.

A fuel injection quantity computed based on the injection-rate parameters td, te, Rα, Rβ, Rmax may be employed as a learning value of the injection-rate parameters for identifying a defective portion in step S32. Alternatively, a ratio of the computed fuel injection quantity relative to the injection command time period Tq may be employed as a learning value of the injection-rate parameters for identifying a defective portion in step S32.

The fuel pressure sensor 20 can be arranged at any place in a fuel supply passage between an outlet 42*a* of the common-rail 42 and the injection port 11*b*. For example, the fuel pressure sensor 20 can be arranged in a high-pressure pipe 42*b* connecting the common-rail 42 and the fuel injector 10. Also, the fuel pressure sensor 20 may be provided in the common-rail 42 or in a fuel supply passage from an outlet of the fuel pump 41 to the common-rail 42.

What is claimed is:

1. A defective-portion detector for a fuel injection system that is provided with a fuel injector injecting a fuel accumulated in an accumulator and a fuel pressure sensor detecting a fuel pressure in a fuel supply passage from the accumulator to an injection port of the fuel injector, the defective-portion detector comprising:

a fuel-pressure-waveform detecting portion which detects a variation in the fuel pressure as a fuel pressure waveform based on a detection value of the fuel pressure sensor;

a fuel-injection-rate parameter computing portion which computes, based on the fuel pressure waveform, a plurality of injection-rate parameters required for identifying an injection-rate waveform corresponding to the fuel pressure waveform;

a determining portion which determines whether each learning value of the injection-rate parameters is an abnormal value; and a defective-portion identifying portion which identifies a defective portion in the fuel injection system based on a combination of abnormal learning values which the determining portion has determined, wherein the injection-rate parameters include an increasing speed of the injection-rate, a decreasing speed of the injection-rate, and a maximum fuel injection-rate, and the defective-portion identifying portion determines that the injection port of the fuel injector is clogged and identifies the injection port as a defective portion when the determining portion determines that the increasing speed and the decreasing speed of the injection-rate are respectively lower than predetermined values and the maximum fuel injection-rate is smaller than a predetermined value.

2. A defective-portion detector according to claim 1, wherein a time period from when a fuel-injection-start command is transmitted to the fuel injector until when the fuel injector actually starts to be opened or the fuel injector actually injects the fuel is defined as a fuel-injection-start time delay, a time period from when a fuel-injection-end command is transmitted to the fuel injector until when the fuel injector actually starts to be closed or the fuel injector actually ends a fuel injection is defined as a fuel-injection-end time delay, and the defective-portion identifying portion identifies the injection port as a defective portion if the determining portion determines that at least one of the fuel-injection-start time delay and the fuel-injection-end time delay is not an abnormal value.

3. A defective-portion detector for a fuel injection system that is provided with a fuel injector injecting a fuel accumulated in an accumulator and a fuel pressure sensor detecting a fuel pressure in a fuel supply passage from the accumulator to an injection port of the fuel injector, the defective-portion detector comprising:

a fuel-pressure-waveform detecting portion which detects a variation in the fuel pressure as a fuel pressure waveform based on a detection value of the fuel pressure sensor;

a fuel-injection-rate parameter computing portion which computes, based on the fuel pressure waveform, a plurality of injection-rate parameters required for identifying an injection-rate waveform corresponding to the fuel pressure waveform;

a determining portion which determines whether each learning value of the injection-rate parameters is an abnormal value; and a defective-portion identifying portion which identifies a defective portion in the fuel injection system based on a combination of abnormal learning values which the determining portion has determined, wherein a time period from when a fuel-injection-start command is transmitted to the fuel injector until when the fuel injector actually starts to be opened or the fuel injector actually injects the fuel is defined as a fuel-injection-start time delay, the injection-rate parameters include at least the fuel-injection-start time delay and an increasing speed of the injection-rate, and the defective-portion identifying portion determines that a driving force of an actuator for opening the fuel injector is deteriorated and identifies the actuator as a defective portion when the determining portion determines that the increasing speed of the injection-rate is lower than a predetermined value and the fuel-injection-start time delay is longer than a predetermined time period.

4. A defective-portion detector according to claim 3, wherein a time period from when a fuel-injection-end command is transmitted to the fuel injector until when the fuel injector actually starts to be closed or the fuel injector actually ends a fuel injection is defined as a fuel-injection-end time delay, and the defective-portion identifying portion identifies the actuator as a defective portion when the determining portion determines that at least one of the fuel-injection-end time delay, the decreasing speed of the injection-rate and the maximum fuel injection-rate is not abnormal value.

5. A defective-portion detector for a fuel injection system that is provided with a fuel injector injecting a fuel accumulated in an accumulator and a fuel pressure sensor detecting a fuel pressure in a fuel supply passage from the accumulator to an injection port of the fuel injector, the defective-portion detector comprising:

a fuel-pressure-waveform detecting portion which detects a variation in the fuel pressure as a fuel pressure waveform based on a detection value of the fuel pressure sensor;

a fuel-injection-rate parameter computing portion which computes, based on the fuel pressure waveform, a plurality of injection-rate parameters required for identifying an injection-rate waveform corresponding to the fuel pressure waveform;

a determining portion which determines whether each learning value of the injection-rate parameters is an abnormal value; and a defective-portion identifying portion which identifies a defective portion in the fuel injection system based on a combination of abnormal learning values which the determining portion has determined, wherein a time period from when a fuel-injection-end command is transmitted to the fuel injector until when the fuel injector actually starts to be closed or the fuel injector actually ends a fuel injection is defined as a fuel-injection-end time delay, the injection-rate parameters include at least the fuel-injection-end time delay and an decreasing speed of the injection-rate, and the defective-portion identifying portion determines that the fuel supply passage is clogged and its flow passage area is decreased and identifies the fuel supply passage as a defective portion when the determining portion determines that the decreasing speed of the injection-rate is higher than a predetermined value and the fuel-injection-end time delay is shorter than a predetermined time period.

6. A defective-portion detector according to claim 5, wherein a time period from when a fuel-injection-start command is transmitted to the fuel injector until when the fuel injector actually starts to be opened or the fuel injector actually injects the fuel is defined as a fuel-injection-start time delay, and the defective-portion identifying portion identifies the fuel supply passage as the defective portion when the determining portion determines that at least one of the fuel-injection-start time delay, the increasing speed of the injection-rate and the maximum fuel injection-rate is not abnormal value.

7. A defective-portion detector for a fuel injection system that is provided with a fuel injector injecting a fuel accumulated in an accumulator and a fuel pressure sensor detecting a fuel pressure in a fuel supply passage from the accumulator to an injection port of the fuel injector, the defective-portion detector comprising:

a fuel-pressure-waveform detecting portion which detects a variation in the fuel pressure as a fuel pressure waveform based on a detection value of the fuel pressure sensor;

a fuel-injection-rate parameter computing portion which computes, based on the fuel pressure waveform, a plurality of injection-rate parameters required for identifying an injection-rate waveform corresponding to the fuel pressure waveform;

a determining portion which determines whether each learning value of the injection-rate parameters is an abnormal value; and a defective-portion identifying portion which identifies a defective portion in the fuel injection system based on a combination of abnormal learning values which the determining portion has determined, wherein a time period from when a fuel-injection-end command is transmitted to the fuel injector until when the fuel injector actually starts to be closed or the fuel injector actually ends a fuel injection is defined as a fuel-injection-end time delay, the injection-rate parameters include at least the fuel-injection-end time delay and an decreasing speed of the injection-rate, and the defective-portion identifying portion determines that a valve-closing mechanism of the fuel injector is faulty and identifies the valve-closing mechanism as the defective portion when the determining portion determines that the fuel-injection-end time delay and the decreasing speed of the injection-rate can not be computed due to a fact that the fuel injection-rate does not start to decrease.

8. A defective-portion detector according to claim 7, wherein a time period from when a fuel-injection-start command is transmitted to the fuel injector until when the fuel injector actually starts to be opened or the fuel injector actually injects the fuel is defined as a fuel-injection-start time delay, and the defective-portion identifying portion identifies the valve-closing mechanism as a defective portion when the determining portion determines that at least one of the fuel-injection-start time delay, the increasing speed of the injection-rate and the maximum fuel injection-rate is not abnormal value.

9. A defective-portion detector according to claim 1, wherein the defective-portion identifying portion performs an identification of the defective portion when the determining portion determines that at least one of the injection-rate parameters is an abnormal value.

10. A defective-portion detector according to claim 3, wherein the defective-portion identifying portion performs an identification of the defective portion when the determining portion determines that at least one of the injection-rate parameters is an abnormal value.

11. A defective-portion detector according to claim 5, wherein the defective-portion identifying portion performs an identification of the defective portion when the determining portion determines that at least one of the injection-rate parameters is an abnormal value.

12. A defective-portion detector according to claim 7, wherein the defective-portion identifying portion performs an identification of the defective portion when the determining portion determines that at least one of the injection-rate parameters is an abnormal value.

* * * * *